(12) United States Patent
Ohnishi

(10) Patent No.: US 8,363,105 B2
(45) Date of Patent: Jan. 29, 2013

(54) CAMERA APPARATUS HAVING AN AUTO-TRACKING FUNCTION

(75) Inventor: Motoo Ohnishi, Kawasaki (JP)

(73) Assignee: Canon Kabushiki Kaisha (JP)

( * ) Notice: Subject to any disclaimer, the term of this patent is extended or adjusted under 35 U.S.C. 154(b) by 594 days.

(21) Appl. No.: 11/755,900

(22) Filed: May 31, 2007

(65) Prior Publication Data
US 2007/0279492 A1    Dec. 6, 2007

(30) Foreign Application Priority Data

Jun. 1, 2006    (JP) .................... 2006-153667
Mar. 1, 2007   (JP) .................... 2007-051259

(51) Int. Cl.
  *H04N 7/18*    (2006.01)
  *H04N 5/225*   (2006.01)
  *H04N 5/232*   (2006.01)
(52) U.S. Cl. .............. 348/155; 348/169; 348/211.99
(58) Field of Classification Search ............ 348/39, 348/207.11, 208.14, 211.99, 211.8, 211.4, 348/211.13, 169
See application file for complete search history.

(56) References Cited

U.S. PATENT DOCUMENTS

| 6,727,940 | B1 * | 4/2004 | Oka et al. ............ 348/211.3 |
| 7,085,423 | B2 * | 8/2006 | Tanigawa ............... 382/239 |
| 7,313,278 | B2 * | 12/2007 | Echigo et al. ............ 382/190 |
| 7,801,328 | B2 * | 9/2010 | Au et al. ............... 382/103 |
| 8,089,510 | B2 * | 1/2012 | Chai et al. ............. 348/113 |
| 2004/0066969 | A1 * | 4/2004 | Aihara ................ 382/173 |
| 2005/0104958 | A1 * | 5/2005 | Egnal et al. ............ 348/143 |
| 2006/0062480 | A1 * | 3/2006 | Fujiyama et al. ......... 382/232 |

FOREIGN PATENT DOCUMENTS

JP      09-261522 A    10/1997

* cited by examiner

*Primary Examiner* — Albert Cutler
(74) *Attorney, Agent, or Firm* — Rossi, Kimms & McDowell LLP

(57) ABSTRACT

A camera apparatus which makes it possible to perform additional camera control during automatic tracking operation within a range in which the automatic tracking operation can be performed without any trouble. A tracking method-calculating section detects a tracking target through analysis of a picked-up image and calculates first camera control parameters for tracking the tracking target. A camera control request input section obtains second camera control parameters from a camera control request accepted from outside the camera apparatus. A camera control method-calculating section calculates third camera control parameters from the first camera control parameters and the second camera control parameters. Further, a camera control section performs camera control according to the third camera control parameters.

12 Claims, 13 Drawing Sheets

CAMERA APPARATUS HAVING AN AUTO-TRACKING FUNCTION

BACKGROUND OF THE INVENTION

1. Field of the Invention

The present invention relates to a camera device equipped with an automatic tracking function for detecting a tracking target through analysis of a picked-up image to thereby perform camera control.

2. Description of the Related Art

Conventionally, there have been proposed camera apparatuses each equipped with an automatic tracking function for tracking a tracking target through analysis of a picked-up image. For example, a camera apparatus has been proposed in which a center-of-gravity position of a tracking target on a picked-up image is calculated such that the tracking target can be viewed in the center of the picked-up image, and the swing of the camera is controlled such that the center-of-gravity position is aligned with a central position of the picked-up image.

Further, a camera apparatus described below is known as one which realizes camera control based on virtual panning, tilting, and zooming operations, by cutting out an arbitrary partial image from a whole image and outputting the partial image.

This camera apparatus, which uses a wide angle optical system including an omnidirectional mirror and a fisheye lens, corrects distortion of a whole image according to a view field range input by a client, and cuts out and outputs a partial image corresponding to the designated view field range (see e.g. Japanese Laid-Open Patent Publication (Kokai) No. H09-261522).

FIG. 9 is a schematic block diagram of the camera apparatus according to the prior art.

As shown in FIG. 9, the camera apparatus includes an image pickup section 901 that captures an image and converts the captured image into an image signal, and an image processing section 902 that performs analog-to-digital conversion, various kinds of image processing, and compression on the image signal as required, and converts the image signal into image data.

The camera apparatus further includes an image output section 903 that outputs the image data, and a tracking method-calculating section 904 that calculates a position of a tracking target in the image and then calculates camera control parameters 1 for performing camera control based on the calculated position.

Further, the camera apparatus includes a camera control request input section 905 that obtains camera control parameters 2 for performing camera control based on a camera control request from a user.

Furthermore, the camera apparatus includes a camera control section 906 that selects either the camera control parameters 1 or the camera control parameters 2 and generates control signals for controlling a panning drive section 907, a tilting drive section 908, and a zooming drive section 909, respectively.

The camera control section 906 selects the camera control parameters 1 as parameters to be used for generation of a control signal when the automatic tracking function is enabled, and selects the camera control parameters 2 when the automatic tracking function is disabled.

The above-mentioned component elements are not necessarily required to be independent or separate from each other, but they may be realized by a CPU, a memory, and a program integrating the functions of the component elements. Further, the camera apparatus may be connected to clients via a network.

In this case, the image output section 903 includes a communication section, and an image display section that expands and displays image data, and the camera control request input section 905 includes a communication section and a client GUI via which a user makes a camera control request.

However, in the conventional camera apparatus, the user is not allowed at all to operate the camera during automatic tracking operation, so that it is required to perform zoom control toward a wider angle of view than an angle of view determined by the automatic tracking function so as to check surroundings of a tracking target, or to perform pan control toward a position slightly forward of a position determined by the automatic tracking function so as to check things existing in the front view field of a person as a tracking target. This makes it impossible to perform fine adjustment of a camera position.

SUMMARY OF THE INVENTION

The present invention provides a camera apparatus which makes it possible to perform additional camera control during automatic tracking operation within a range in which the automatic tracking operation can be performed without any trouble.

In a first aspect of the present invention, there is provided a camera apparatus comprising a tracking method-calculating section configured to detect a tracking target through analysis of a picked-up image and calculate first camera control parameters for tracking the tracking target, a camera control request input section configured to obtain second camera control parameters from a camera control request accepted from outside the camera apparatus, a camera control method-calculating section configured to calculate third camera control parameters corresponding to a shooting range which contains a shooting range corresponding to the first camera control parameters, and on which the second camera control parameters are reflected, and a camera control section configured to perform camera control according to the third camera control parameters.

With the configuration of the camera apparatus according to the first aspect of the present invention, the tracking method-calculating section detects a tracking target through analysis of a picked-up image and calculate first camera control parameters for tracking the tracking target, and the camera control request input section obtains second camera control parameters from a camera control request accepted from outside the camera apparatus. The camera control method-calculating section calculates third camera control parameters corresponding to a shooting range which contains a shooting range corresponding to the first camera control parameters, and on which the second camera control parameters are reflected, and a camera control section configured to perform camera control according to the third camera control parameters.

Therefore, it is possible to perform additional camera control within a range in which the automatic tracking operation can be performed without any trouble, so that the user can grasp surroundings of the tracking target more accurately.

When the camera control request input section accepts the camera control request in a state where an automatic tracking function is enabled, the camera control method-calculating section can calculate the third camera control parameters such that the third camera control parameters satisfy conditional expressions based on the first camera control parameters and the second camera control parameters, and the shooting range corresponding thereto includes a shooting range defined when control is performed according to the first camera control parameters.

Assuming that a first image size is defined as an image size of a partial image in a picked-up image obtained when control is performed according to the third camera control parameters, the partial image corresponding to a shooting range defined when control is performed according to the first camera control parameters, and a second image size is defined as a minimum image size of a tracking target that can be detected by the tracking method-calculating section, the conditional expressions used by the camera control method-calculating section can include conditional expressions for preventing the first image size from becoming smaller than the second image size.

The conditional expressions used by the camera control method-calculating section can be included in part of software implementing the camera control method-calculating section.

The conditional expressions used by the camera control method-calculating section can be included in a part of a circuit implementing the camera control method-calculating section.

The camera control request input section can include a graphic user interface for accepting user input concerning a camera control method, and the graphic user interface can include a graphic user interface component via which the second camera control parameters are input, or a graphic user interface component via which information on information between the first camera control parameters and the second camera control parameters is input.

In a second aspect of the present invention, there is provided a camera apparatus comprising an image pickup section configured to obtain a whole image, a cut-out area-generating section configured to output a first cut-out area, a cut-out area-determining section configured to accept an additional camera control request and output a second cut-out area based on the additional camera control request, the additional camera control request containing conditions concerning a relative position or size of the second cut-out area with respect to a position or size of the first cut-out area, and an image cutting section configured to cut out a partial image from the whole image based on the second cut-out area and output the partial image, wherein when a position or size of the first cut-out area changes, the cut-out area-determining section changes the second cut-out area such that the conditions are satisfied.

When the cut-out area-determining section accepts the additional camera control request, the cut-out area-determining section can cause the position or size of the second cut-out area to coincide with that of the first cut-out area.

The camera apparatus can further comprise a cut-out area output section configured to output to a display device a graphic user interface for displaying a relative position or size of each of the first cut-out area and the second cut-out area with respect to the whole image.

The cut-out area-generating section can calculate the first cut-out area in a manner tracking a tracking target appearing in the whole image output from the image pickup section.

The cut-out area-generating section can calculate the first cut-out area according to a cut-out area modification schedule registered in advance.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
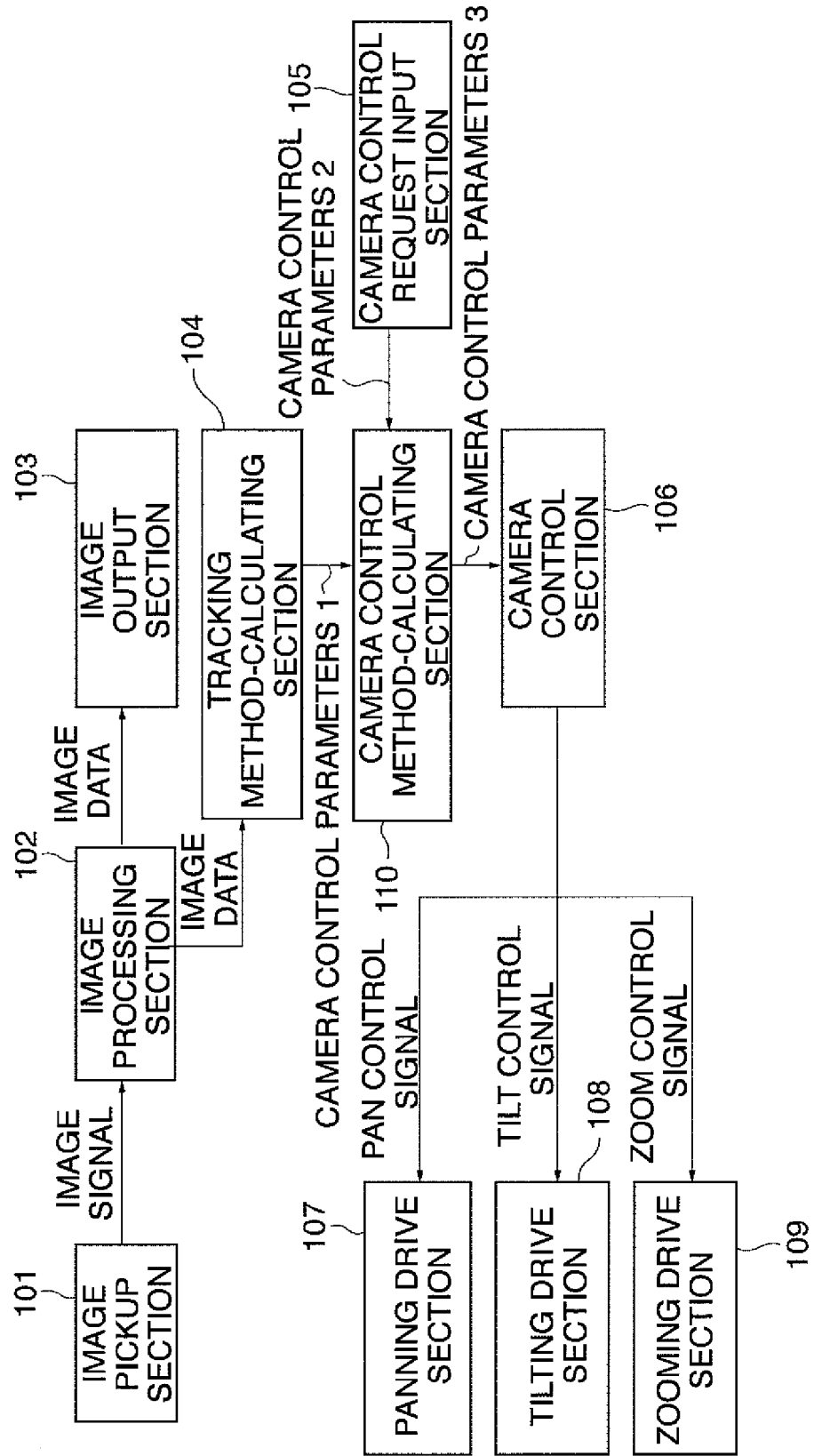
FIG. 1 is a schematic block diagram of a camera apparatus according to a first embodiment of the present invention.

FIG. 1 is a schematic block diagram of a camera apparatus according to a first embodiment of the present invention.

As shown in FIG. 1, the camera apparatus includes an image pickup section 101 that captures an image and converts the captured image into an image signal, and an image processing section 102 that converts the image signal into image data by performing analog-to-digital conversion, various kinds of image processing, and compression on the image signal, as required.

The camera apparatus further includes an image output section 103 that outputs the image data, and a tracking method-calculating section 104 that calculates a position of a tracking target in the image and then calculates camera control parameters 1 for performing camera control based on the calculated position. The tracking target is detected through analysis of a picked-up image executed by a method based on background difference, inter-frame difference, or pattern matching. The position of the tracking target is determined e.g. by calculating the center-of-gravity position of the tracking target on the picked-up image. In this case, the swing of the camera is controlled such that the center-of-gravity position is aligned with the central position of the picked-up image.

Further, the camera apparatus includes a camera control request input section 105 that obtains camera control parameters 2 for performing camera control based on a camera control request externally made by a user.

Furthermore, the camera apparatus includes a camera control method-calculating section 110 that generates camera control parameters 3 from the camera control parameters 1 and 2.

The camera apparatus also includes a camera control section 106 that generates control signals for controlling a panning drive section 107, a tilting drive section 108, and a zooming drive section 109, respectively.

The above-mentioned component elements are not necessarily required to be independent or separate, but some or all of them may be realized by a CPU, a memory, and a program integrating the functions of some or all of the component elements. Further, the camera apparatus may be connected to clients via a network.

In this case, the image output section 103 includes a communication section, and an image display section that expands and displays image data, and the camera control request input section 105 includes a communication section, and a client GUI via which a user makes a camera control request.

Figure 2:
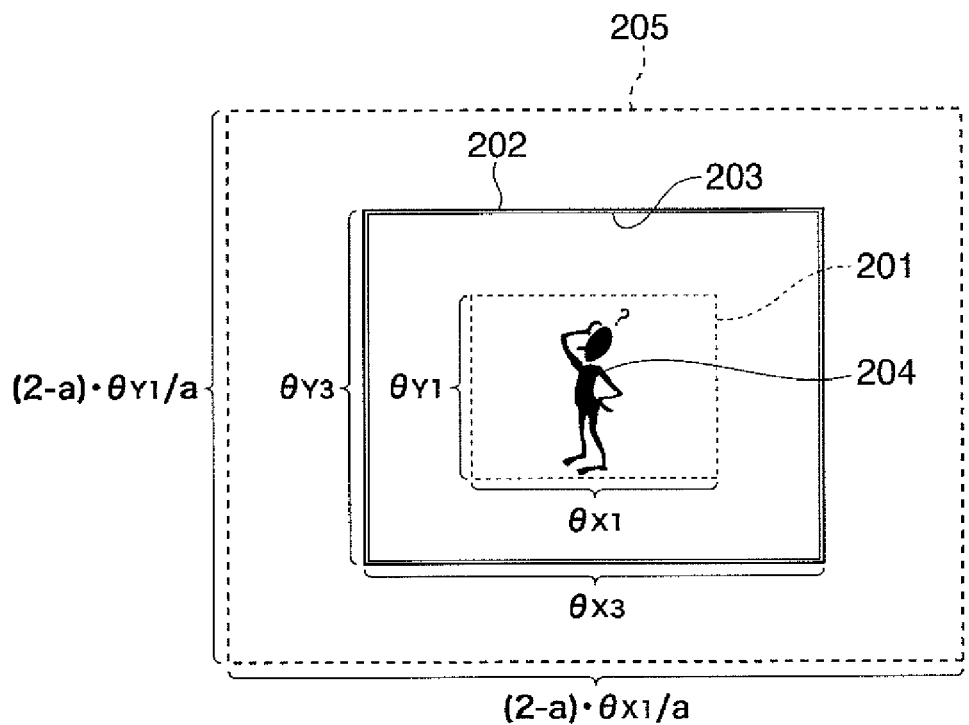
FIG. 2 is a view illustrating the relationship between camera control parameters appearing in FIG. 1.

FIG. 2 is a view illustrating the relationship between the camera control parameters appearing in FIG. 1.

In FIG. 2, there are shown a shooting range 201 defined by the camera control parameters 1, a shooting range 202 defined by the camera control parameters 2, and a shooting range 203 defined by the camera control parameters 3. The camera control parameters 1 are determined by the tracking method-calculating section 104 such that a tracking target 204 can be constantly captured in a constant size and in a constant position with respect to a picked-up image. A visible range 205 illustrates a limit of the shooting range 203 defined by the camera control parameters 3 in a case where an automatic tracking function is enabled.

The camera control parameters 3 are determined such that the shooting range 203 defined thereby is always within the visible range 205 and at the same time contains the shooting range 201 defined by the camera control parameters 1. Further, a ratio of the image size of the shooting range 201 defined by the camera control parameters 1 to the image size of the shooting range 203 defined by the camera control parameters 3 is preset to a lower limit value "a" which is not larger than 1 and large than 0. The lower limit value "a" is set for setting conditions for a minimum detectable image size so as to prevent the image size of the shooting range 201 from becoming too small to detect the tracking target 204.

It is now assumed that the coordinates of the central position of the shooting range 201, a lateral angle of view, and a vertical angle of view, as the camera control parameters 1, are (x1, y1), θx1, and θy1, respectively. Further, it is assumed that the coordinates of the central position of the shooting range 203, a lateral angle of view, and a vertical angle of view, as the camera control parameters 3, are (x3, y3), θx3, and θy3, respectively.

In this case, the camera control parameters 3 are determined such that the values thereof always satisfy conditional expressions shown below. The central position of the visible range 205 coincides with that of the shooting range 201 defined by the camera control parameters 1, and the size of the visible range 205 is equal to a size obtained by multiplying the shooting range 201 defined by the camera control parameters 1 by (2−a)/a.

$$\theta_{x3} \geq \theta_{x1} \tag{1}$$

$$\theta_{y3} \geq \theta_{y1} \tag{2}$$

$$\theta_{x3} \leq \frac{\theta_{x1}}{a} \tag{3}$$

$$\theta_{y3} \leq \frac{\theta_{y1}}{a} \tag{4}$$

$$x3 - \frac{\theta_{x3}}{2} \leq x1 - \frac{\theta_{x1}}{2} \tag{5}$$

$$y3 - \frac{\theta_{y3}}{2} \leq y1 - \frac{\theta_{y1}}{2} \tag{6}$$

$$x3 + \frac{\theta_{x3}}{2} \geq x1 + \frac{\theta_{x1}}{2} \tag{7}$$

$$y3 + \frac{\theta_{y3}}{2} \geq y1 + \frac{\theta_{y1}}{2} \tag{8}$$

$$x3 - \frac{\theta_{x3}}{2} \geq x1 - \frac{(2-a)\theta_{x1}}{2a} \tag{9}$$

$$y3 - \frac{\theta_{y3}}{2} \geq y1 - \frac{(2-a)\theta_{y1}}{2a} \tag{10}$$

$$x3 + \frac{\theta_{x3}}{2} \leq x1 + \frac{(2-a)\theta_{x1}}{2a} \tag{11}$$

$$y3 + \frac{\theta_{y3}}{2} \leq y1 + \frac{(2-a)\theta_{y1}}{2a} \tag{12}$$

Figure 3:
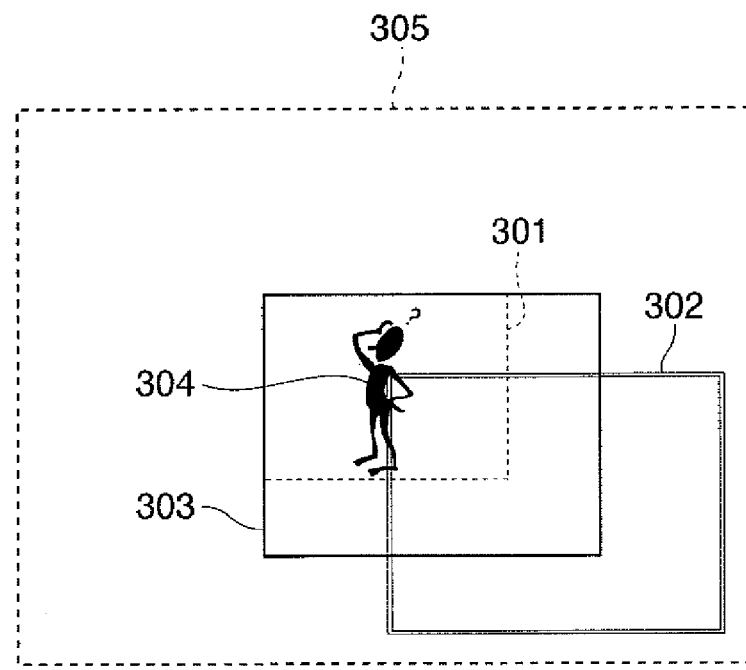
FIG. 3 is a view illustrating a change in camera control parameter 3 corresponding to a change in camera control parameters 2 appearing in FIG. 1 (first example).
Figure 4:
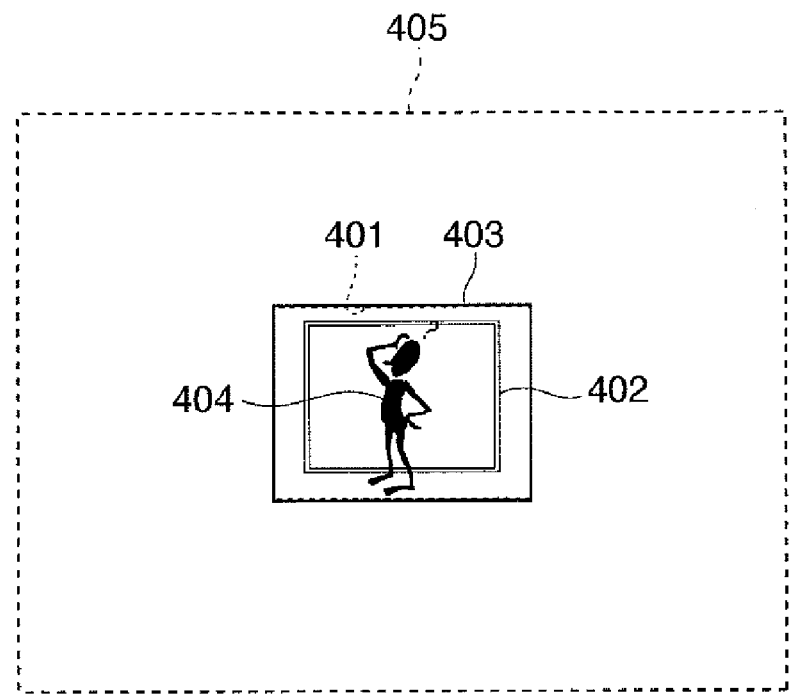
FIG. 4 is a view illustrating a change in the camera control parameters 3 corresponding to a change in the camera control parameters 2 (second example).
Figure 5:
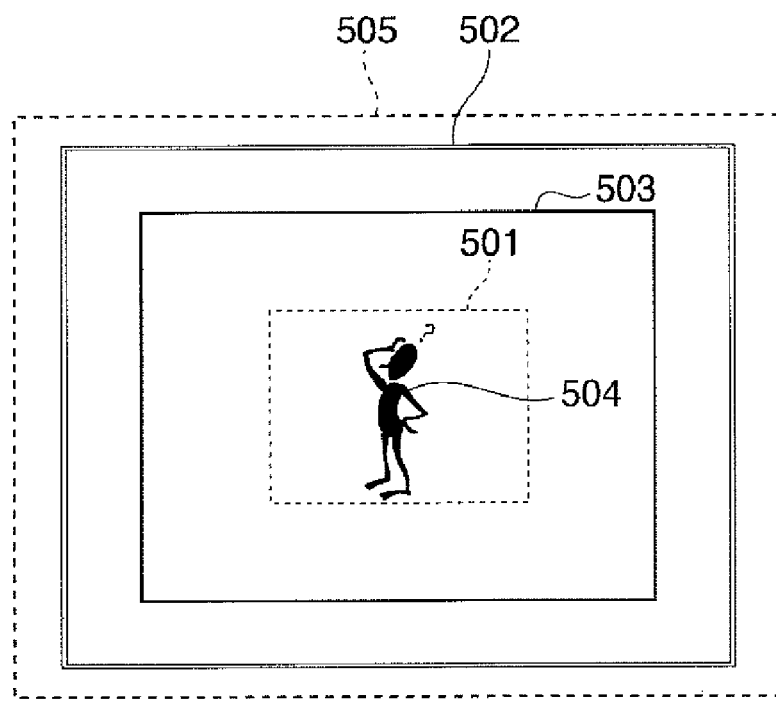
FIG. 5 is a view illustrating a change in the camera control parameters 3 corresponding to a change in the camera control parameters 2 (third example).

FIGS. 3 to 5 are views illustrating changes in the camera control parameters 3 corresponding to respective changes in the camera control parameters 2 appearing in FIG. 1.

In the illustrated state in FIG. 2, when the camera control parameters 2 are substituted for the corresponding ones of the camera control parameters 3 in the above conditional expressions, they satisfy the above conditional expressions. That is, values of the camera control parameters 3 are equal to corresponding ones of the camera control parameters 2, and therefore the shooting range 202 defined by the camera control parameters 2 and the shooting range 203 defined by the camera control parameters 3 coincide with each other.

In a state shown in FIG. 3, if the values of the camera control parameters 2 are directly substituted for the corresponding ones of the camera control parameters 3, the conditional expressions (5) and (8) are not satisfied.

Therefore, to satisfy the conditional expressions, the values of the camera control parameters 2 are adjusted such that the left and upper sides of a shooting range 303 defined by the camera control parameters 3 as the adjusted values of the camera control parameters 2 coincide with the respective left and upper sides of a shooting range 301 defined by the camera control parameters 1, whereby the values of the camera control parameters 3 are determined.

In a state shown in FIG. 4, if the values of the camera control parameters 2 are directly substituted for the corresponding ones of the camera control parameters 3, the conditional expressions (1) and (2) are not satisfied.

Therefore, to satisfy the conditional expressions, the values of the camera control parameters 2 are adjusted such that a shooting range 403 defined by the camera control parameters 3 as the adjusted values of the camera control parameters 2 coincides with a shooting range 401 defined the camera control parameters 1, whereby the values of the camera control parameters 3 are determined.

In a state shown in FIG. 5, if the values of the camera control parameters 2 are directly substituted for the corresponding ones of the camera control parameters 3, the conditional expressions (3) and (4) are not satisfied.

Therefore, to satisfy the conditional expressions, the values of the camera control parameters 2 are adjusted such that a shooting range 503 defined by the camera control parameters 3 as the adjusted values of the camera control parameters 2 becomes 1/a-th as large as a shooting range 501 defined by the camera control parameters 1, whereby the values of the camera control parameters 3 are determined.

It should be noted that the reference numerals in each of FIGS. 3 to 5 correspond to those in FIG. 2.

Figure 6A:
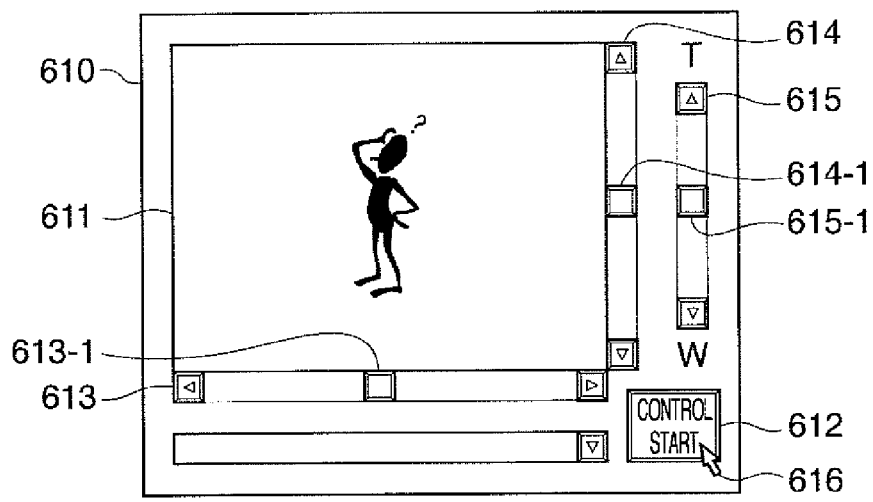
FIG. 6 is a view illustrating, by way of example, a client GUI in a case where the camera apparatus in FIG. 1 is connected to a client via a network.
Figure 6B:
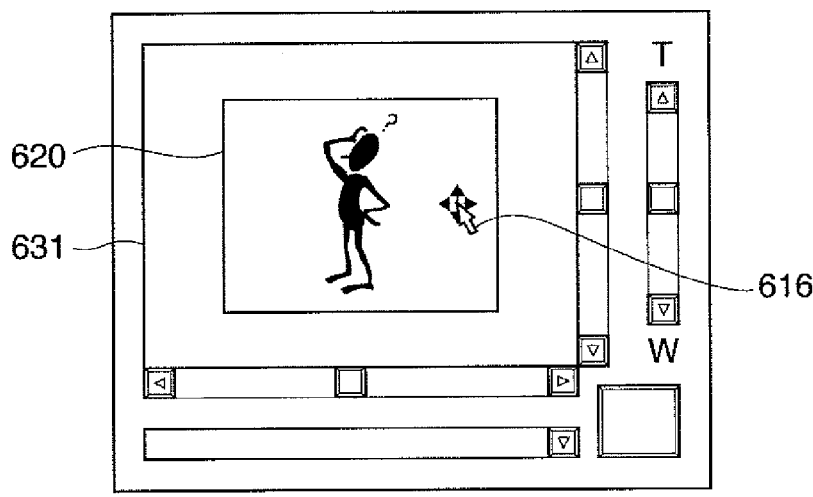
Figure 6C:
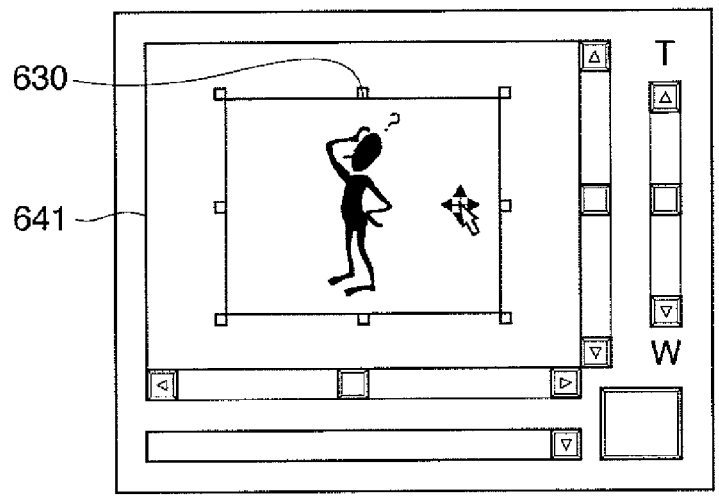

FIG. 6 is a view illustrating, by way of example, the client GUI of the camera control request input section 105 in a case where the camera apparatus in FIG. 1 is connected to a client via a network. In this case, the camera request input section 105 is formed by part of the client.

In FIG. 6, the client GUI 610 of the camera control request input section 105 is provided with an image window 611 for displaying an image received from the camera apparatus, and a control start button 612 for notifying the camera apparatus of the start of control.

Further, the client GUI 610 is provided with a pan scroll bar 613 for use in requesting pan control, a tilt scroll bar 614 for use in requesting tilt control, and a zoom scroll bar 615 for use in requesting zoom control.

The pan, tilt, and zoom scroll bars 613 to 615 are provided with respective knobs 613-1, 614-1, and 615-1. First, the user clicks the control start button 612 using a mouse cursor 616, so as to obtain control rights over the camera apparatus. Then, the user drags the knob 613-1, 614-1, or 615-1 to thereby request a pan, tilt, or zoom control operation.

The positions of the respective knobs 613-1, 614-1, and 615-1 always reflect current pan, tilt, and zoom positions of the camera apparatus, respectively.

Not only when the camera control operations requested by the user dragging the knobs 613-1, 614-1, and 615-1 are performed, but also when pan, tilt, and zoom control operations are executed by the camera apparatus using the automatic tracking function, the positions of the respective knobs 613-1, 614-1, and 615-1 change in a manner reflecting a camera position after the control operations.

Therefore, if a camera control operation corresponding to the position of a dragged knob cannot be performed e.g. due to failure in satisfying the aforementioned conditional expressions, the position of the dragged knob changes according to the result of the control.

Further, in the GUI shown in FIG. 6, it is also possible to request camera control using a tracking target-capturing frame 620 displayed when the control rights are obtained in the case where the automatic tracking function is enabled on the camera apparatus side. When the user moves the mouse cursor 616 into the tracking target-capturing frame 620 and clicks the same, the tracking target-capturing frame 620 turns into a selection state, such as a tracking target-capturing frame 630, which allows the user to move the frame or change its size by dragging.

The tracking target-capturing frame immediately after being dragged with respect to the image window corresponds to the camera control parameters 1 with respect to the camera control parameters 2, and it is possible to designate the camera control parameters 2 by changing the position and size of the tracking target-capturing frame. Further, the display range of an image window 641 immediately after execution of the camera control by dragging the tracking target-capturing frame corresponds to the shooting range defined by the camera control parameters 3.

Figure 7A:
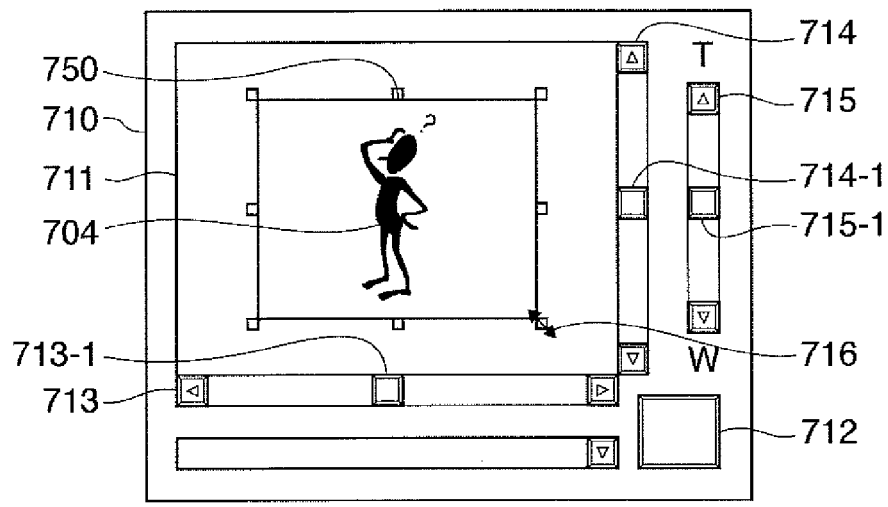
FIG. 7 is a view illustrating changes of a screen displayed in the client GUI in FIG. 6, occurring when a tracking target-capturing frame is made smaller by dragging the same.
Figure 7B:
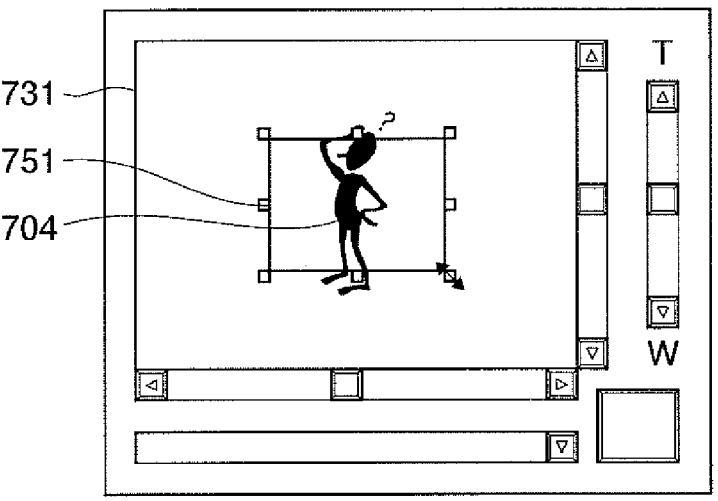
Figure 7C:
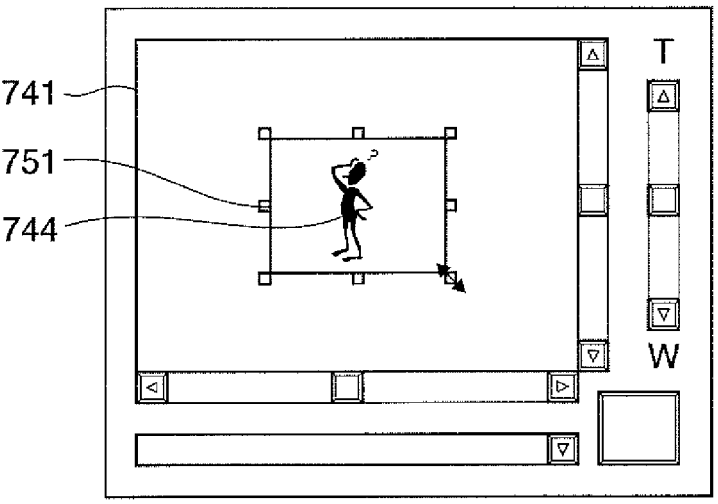

FIG. 7 is a view illustrating changes of a screen displayed when the tracking target-capturing frame is made smaller by dragging the same in the client GUI in FIG. 6.

In FIG. 7, when a mouse cursor 716 is moved onto a corner of a tracking target-capturing frame 750, the mouse cursor 716 is displayed as an oblique arrow, as shown in FIG. 7, whereby the size of the tracking target-capturing frame can be changed.

Using the mouse cursor 716 in this state, when the size of the tracking target-capturing frame 750 is reduced to the size of a tracking target-capturing frame 751, control is performed such that the shooting range defined by the camera control parameters 2 becomes larger with respect to the shooting range defined by the camera control parameters 1.

Therefore, assuming that the camera control parameters 2 satisfies the conditional expressions and can be directly substituted for the values of the camera control parameters 3, zoom control is performed toward a wider angle of view. During the zoom control operation, a tracking target 704 becomes smaller in size on an image window 741 while maintaining its relative position and size to the position and size of the tracking target-capturing frame 751, as illustrated by a tracking target 744.

It should be noted that reference numerals 710 to 715 correspond to the respective reference numerals 610 to 615 in FIG. 6.

Figure 8A:
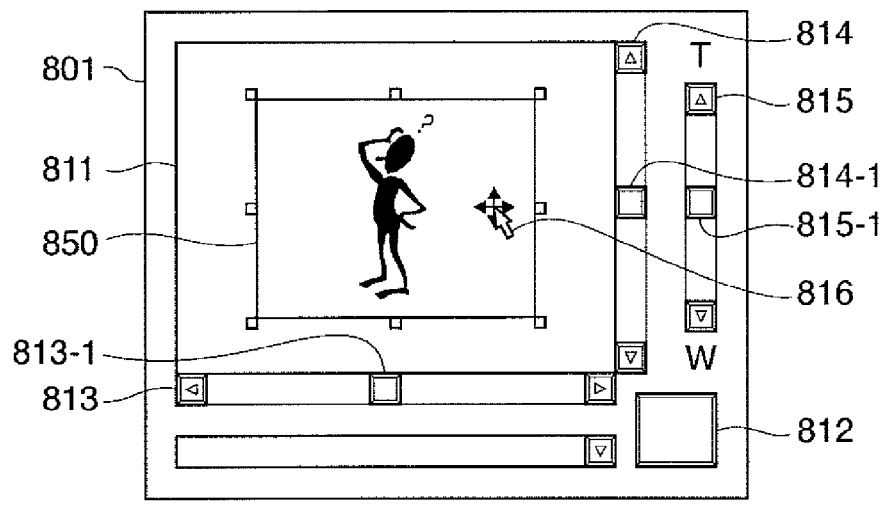
FIG. 8 is a view illustrating changes of the screen displayed in the client GUI in FIG. 7, occurring when the tracking target-capturing frame is shifted by dragging the same.
Figure 8B:
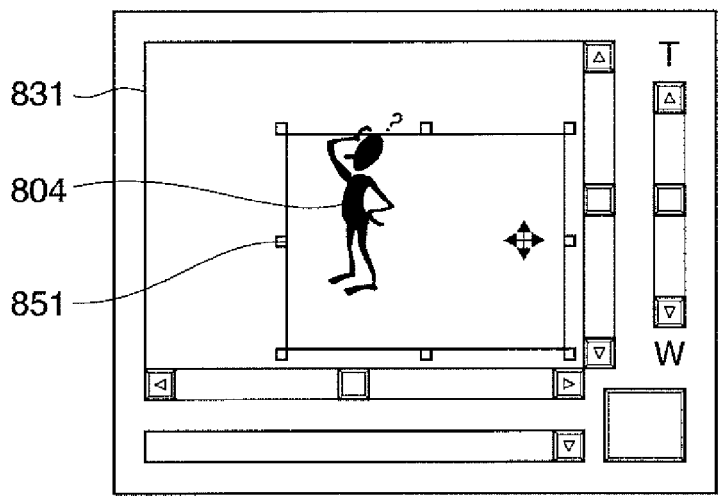
Figure 8C:
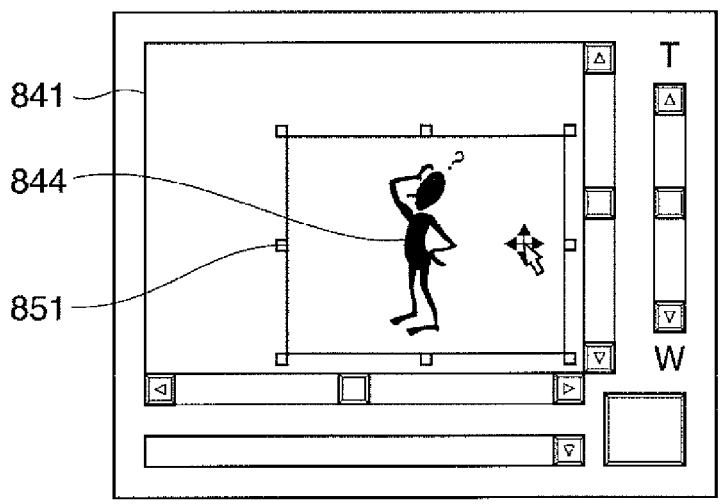
Figure 9:
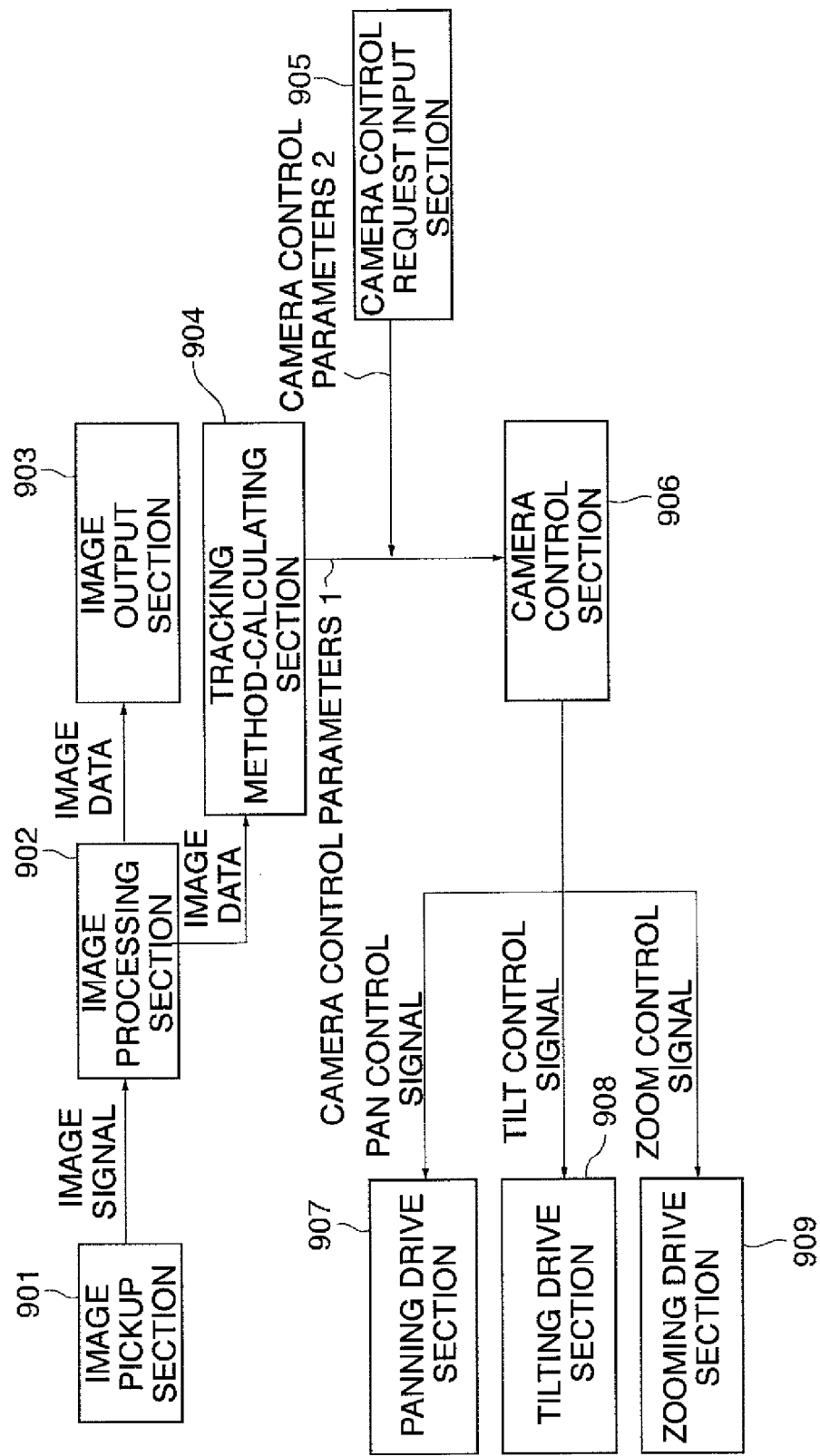
FIG. 9 is a schematic block diagram of a camera apparatus according to the prior art.

FIG. 8 is a view illustrating changes of a screen displayed when the tracking target-capturing frame is moved by dragging the same in the client GUI in FIG. 7.

In FIG. 8, by moving a mouse in a state where a tracking target-capturing frame 850 is caught by a mouse cursor 816, it is possible to move the tracking target-capturing frame 850 without changing its size. When the tracking target-capturing frame 850 is moved in this state into a lower right corner as illustrated by a tracking target-capturing frame 851, the shooting range defined by the camera control parameters 2 with respect to the shooting range defined by the camera control parameters 1 shifts leftward and upward of the shooting range defined by the camera control parameters 1.

Therefore, assuming that the camera control parameters 2 satisfies the conditional expressions and can be directly substituted for the values of the camera control parameters 3, pan control in the leftward direction and tilt control in the upward direction are performed. During the pan and tilt control operations, a tracking target 804 changes its position on an image window 841 while maintaining its relative position and size to the position and size of the tracking target-capturing frame 851, as illustrated by a tracking target 844.

It should be noted that reference numerals 810 to 815 correspond to the respective reference numerals 610 to 615 in FIG. 6.

Figure 10:
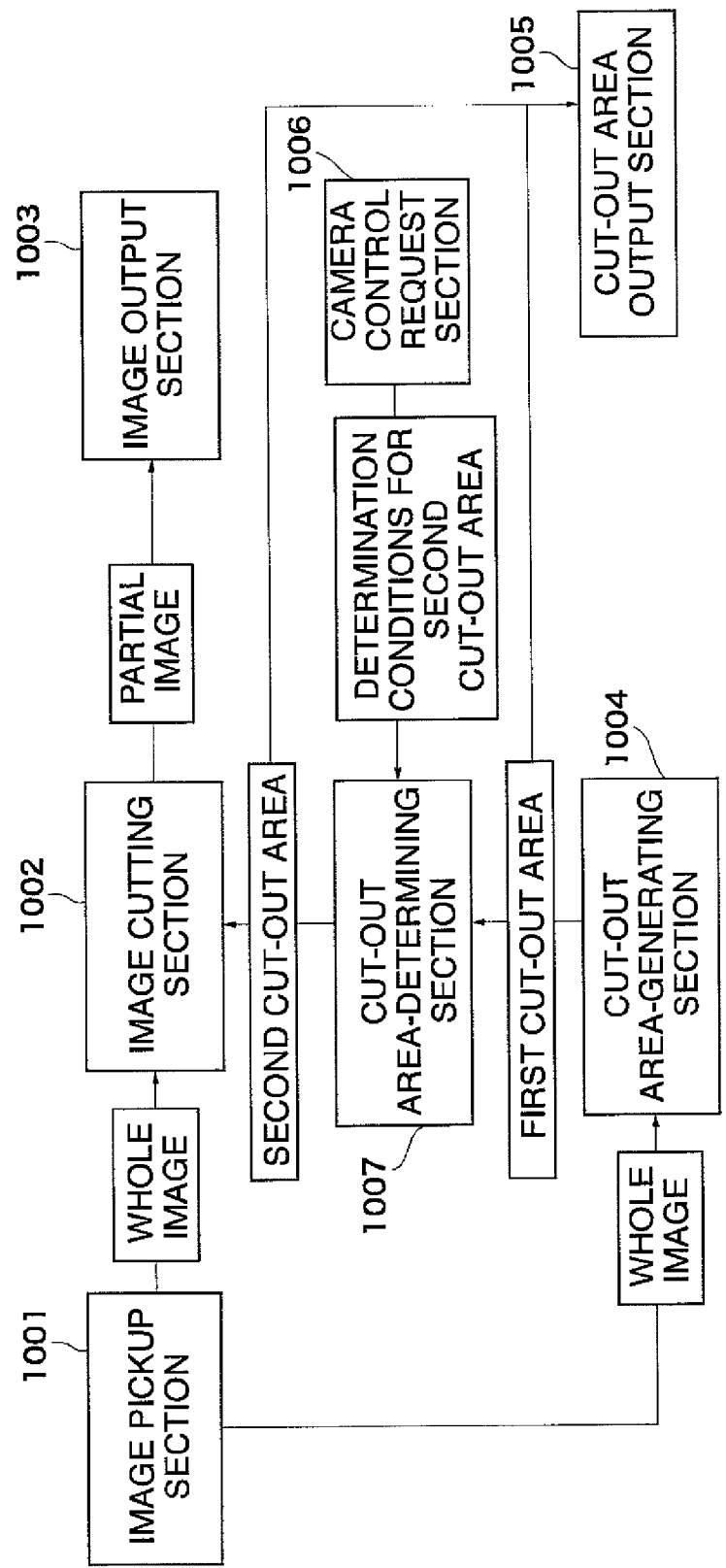
FIG. 10 is a schematic block diagram of a camera apparatus according to a second embodiment of the present invention.

FIG. 10 is a schematic block diagram of a camera apparatus according to a second embodiment of the present invention.

Referring to FIG. 10, the present camera apparatus includes an image pickup section 1001 that captures a scene and generates whole image data, and an image cutting section 1002 that cuts out an input cut-out area from a whole image and generates partial image data.

The camera apparatus further includes an image output section 1003 that outputs input image data to a display unit or the like, a cut-out area-generating section 1004 that calculates the position and size of a tracking target in a whole image based on image recognition of the input whole image, and calculates and outputs a first cut-out area containing the tracking target. The camera apparatus also includes a cut-out area output section 1005 that outputs to the display unit or the like a diagrammatic representation of the position and size of the first cut-out area and those of a second cut-out area, described hereinafter, with respect to the whole image. A cut-out area to be used by the image cutting section 1002 for generation of partial image data is output by the cut-out area-generating section 1004.

In addition to the above-described component elements, the present camera apparatus includes a camera control-requesting section 1006 that accepts a camera control request from the user and outputs determination conditions for determining the second cut-out area to be input to the image cutting section 1002.

Further, the camera apparatus includes a cut-out area-determining section 1007 that generates the second cut-out area to be input to the image cutting section 1002, based on the determination conditions for determining the second cut-out area and the first cut-out area output by the cut-out area-generating section 1004.

Input to the cut-out area output section 1005 are the first cut-out area generated by the cut-out area-generating section 1004 and the second cut-out area generated by the cut-out area-determining section 1007. Then, the diagrammatic representation of the positions and sizes of the respective first and second cut-out areas in the whole image is output to the display unit or the like.

The above-described component elements are not necessarily required to be independent or separate, but they may be realized by a CPU, a memory, and a program integrating the functions of the component elements.

Although in FIG. 10, it is assumed that the cut-out area-generating section 1004 generates a cut-out area according to the position and size of a tracking target by image recognition, the cut-out area may be generated according to a cut-out area modification schedule registered in advance. In this case, the cut-out area-generating section 1004 does not need input of a whole image.

Further, the camera apparatus may be connected to a client via a network. In this case, the image output section 1003, the cut-out area output section 1005, and the camera control-requesting section 1006 are formed by part of the client. More specifically, the image output section 1003 includes a communication section and an image display section that expands and display image data. Further, the cut-out area output section 1005 and the camera control-requesting section 1006 include a communication section and a GUI of the client via which operation inputs from the user are accepted and operation results are fed back.

Figure 11:
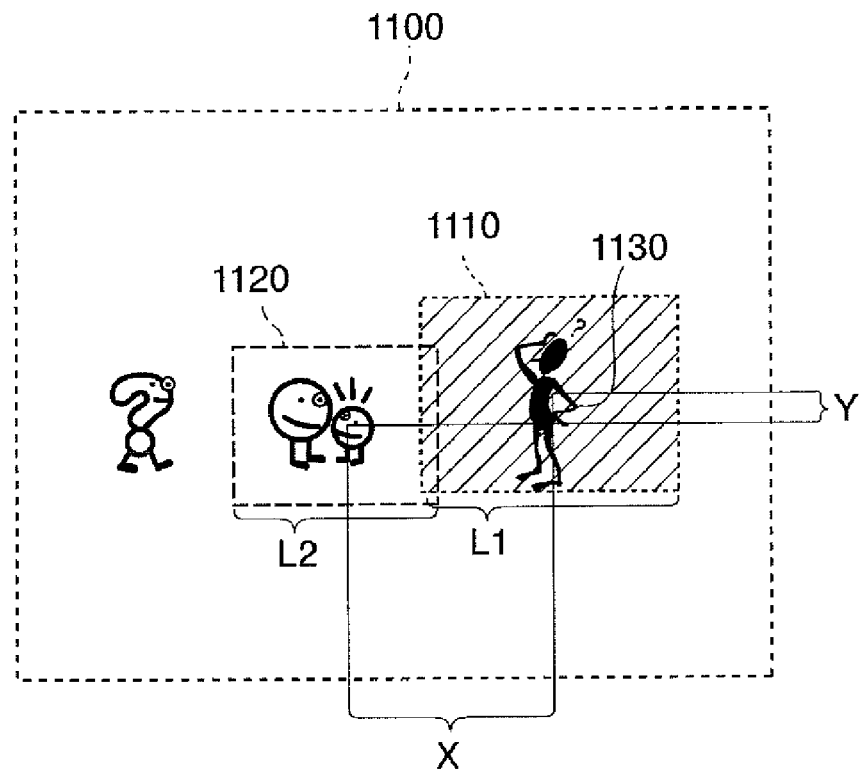
FIG. 11 is a view illustrating the relative positional relationship between first and second cut-out areas and a whole image in the camera apparatus shown in FIG. 10, together with changes of the respective areas occurring when a tracking target is moved (first example).
Figure 12:
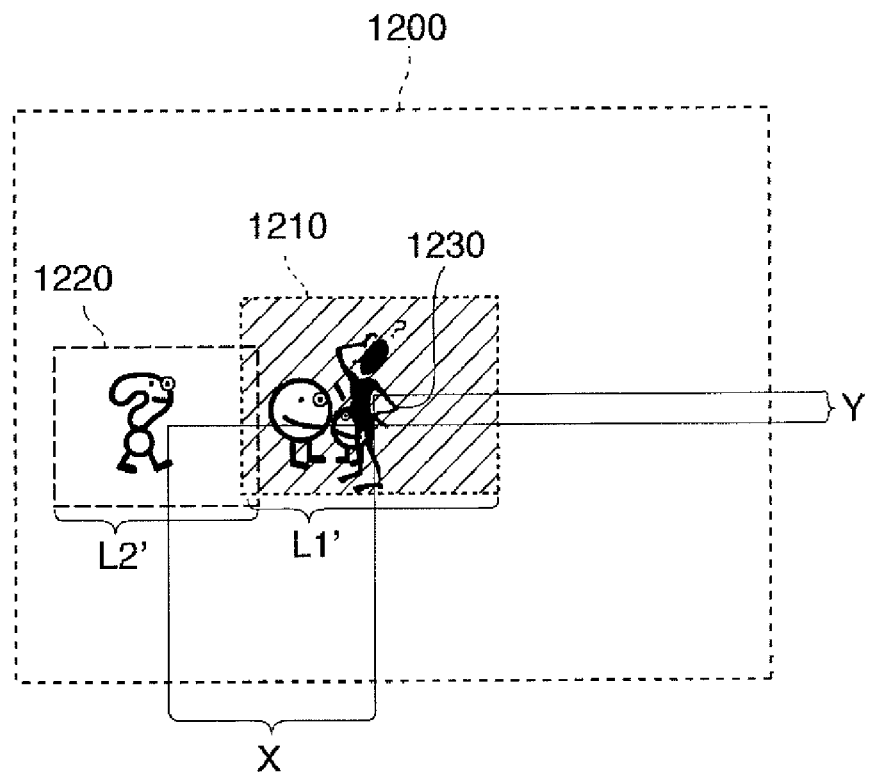
FIG. 12 is a view illustrating the relative positional relationship between the first and second cut-out areas and the whole image in the camera apparatus shown in FIG. 10, together changes of the respective areas occurring when the tracking target is moved (second example).
Figure 13:
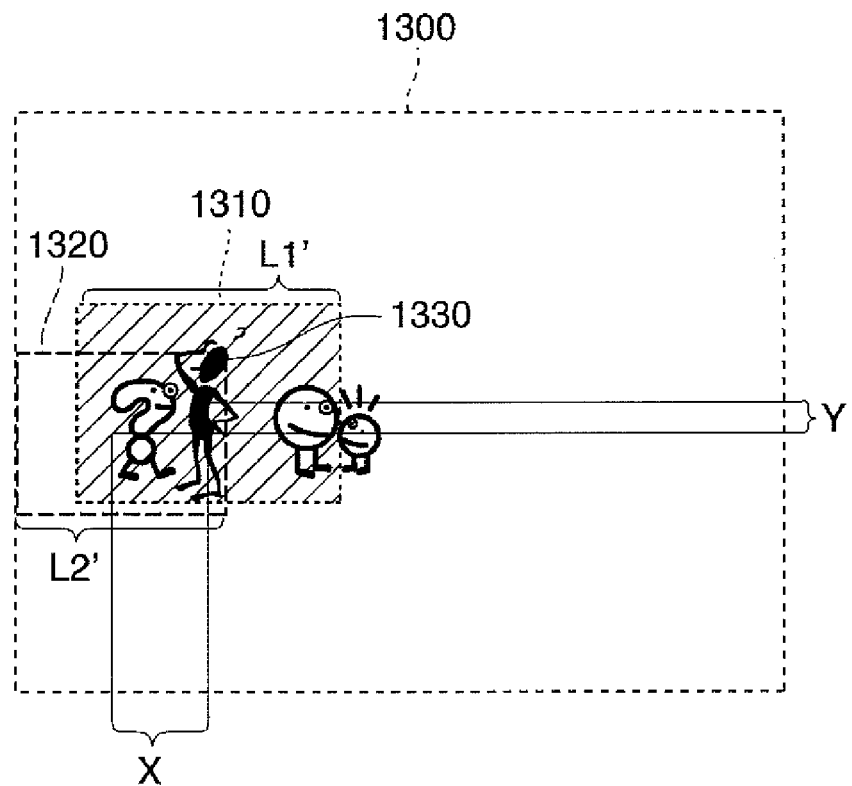
FIG. 13 is a view illustrating the relative positional relationship between the first and second cut-out areas and the whole image in the camera apparatus shown in FIG. 10, together with changes of the respective areas occurring when the tracking target is moved (third example).

FIGS. 11 to 13 are views illustrating the relative positional relationship between first and second cut-out areas and a whole image, together with changes of the respective cut-out areas occurring when a tracking target is moved. In FIGS. 11 to 13, reference numerals 1100, 1110, 1120, and 1130 correspond to respective reference numerals 1200, 1210, 1220, and 1230, and respective reference numerals 1300, 1310, 1320, and 1330.

3 The first and second cut-out areas 1110 and 1120 are displayed on the whole image 1100. The first cut-out area 1110 is set by the cut-out area-generating section 1004 such that a tracking target 1130 can be always captured in a fixed size and in a fixed position.

On the other hand, the second cut-out area 1120 is set by the camera control-requesting section 1006 to a size and a position designated by instructions input by the user. When the tracking target 1130 shifts as illustrated in FIG. 12, the first cut-out area changes into a cut-out area designated by the reference numeral 1210, and the second cut-out area has its position and size changed in accordance with the change of the first cut-out area, and turns into a cut-out area designated by the reference numeral 1220.

Now, let it be assumed that the first cut-out area 1110 and the second cut-out area 1120 have respective widths of L1 and L2, and lateral and vertical center-to-center distances between the two cut-out areas 1110 and 1120 are equal to respective values X and Y. In this case, on condition that the relative positional relationship between the first and second cut-out areas remains unchanged, the lateral and vertical center-to-center distances remain X and Y, respectively, even after shift of the tracking target as shown in FIG. 12.

On the other hand, although the widths of the respective cut-out areas change to L1' and L2', respectively, if the size of the first cut-out area and that of the second cut-out area change proportionally, L1'/L2'=L1/L2 holds. Further, on condition that the size of the second cut-out area is held constant irrespective of the size of the first cut-out area, L2'=L2 holds.

When the tracking target 1130 moves as illustrated in FIG. 13, the first cut-out area changes into a cut-out area designated by the reference numeral 1310, and the second cut-out area changes in accordance with the change of the first cut-out area. At this time, if the condition that the relative positional relationship between the first and second cut-out areas does not change is maintained, the left end of the second cut-out area is moved to lie off that of the whole image. To avoid this, the lateral center-to-center distance is changed from X to X' such that the left end of the second cut-out area coincides with that of the whole image.

Figure 14:
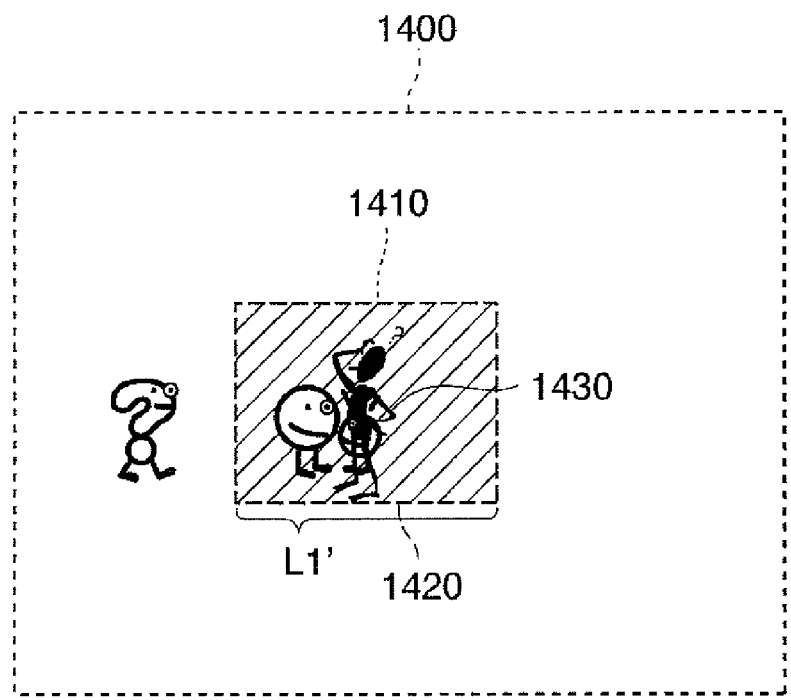
FIG. 14 is a view illustrating changes of the respective first and second cut-out areas, which occur when the camera apparatus shown in FIG. 10 accepts a cut-out area restoration request (first example).
Figure 15:
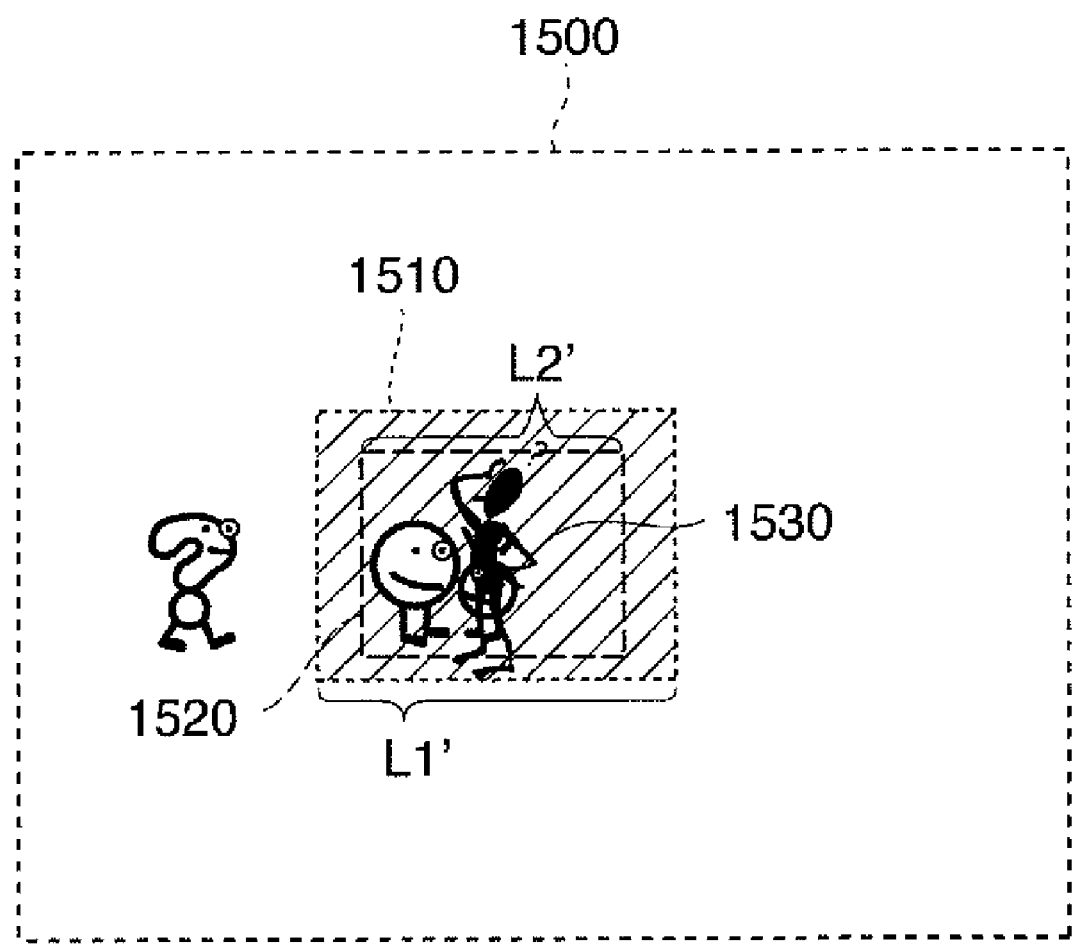
FIG. 15 is a view illustrating changes of the respective first and second cut-out areas which occur when the camera apparatus shown in FIG. 10 accepts the cut-out area restoration request (second example)

FIGS. 14 and 15 are views illustrating changes of the respective first and second cut-out areas, which occur when a cut-out area restoration request is accepted. Respective reference numerals 1400, 1410, 1420, and 1430, and respective reference numerals 1500, 1510, 1520, and 1530 correspond to the reference numerals 1100, 1110, 1120, and 1130 in FIG. 11.

When a cut-out area restoration request for requesting restoration of both the position and size of a cut-out area is accepted in a state shown in FIG. 12, a first cut-out area 1410 does not change, as shown in FIG. 14. However, a second cut-out area 1420 changes to coincide with the first cut-out area 1410, whereby a state before execution of additional camera control responsive to the instructions by the user is recovered.

On the other hand, when a cut-out area restoration request for requesting restoration of only the position of a cut-out area is accepted, the size of a second cut-out area 1520 remains unchanged, and only the center of the same changes to coincide with that of a first cut-out area 1510, as shown in FIG. 15.

FIGS. 16A, 16B and 17A, 17B are views illustrating, by way of example, GUI screens displayed by the image output section and the cut-out area output section. The reference numerals in FIGS. 16A and 16B and those in FIGS. 17A and 17B correspond to each other.

Figure 16A:
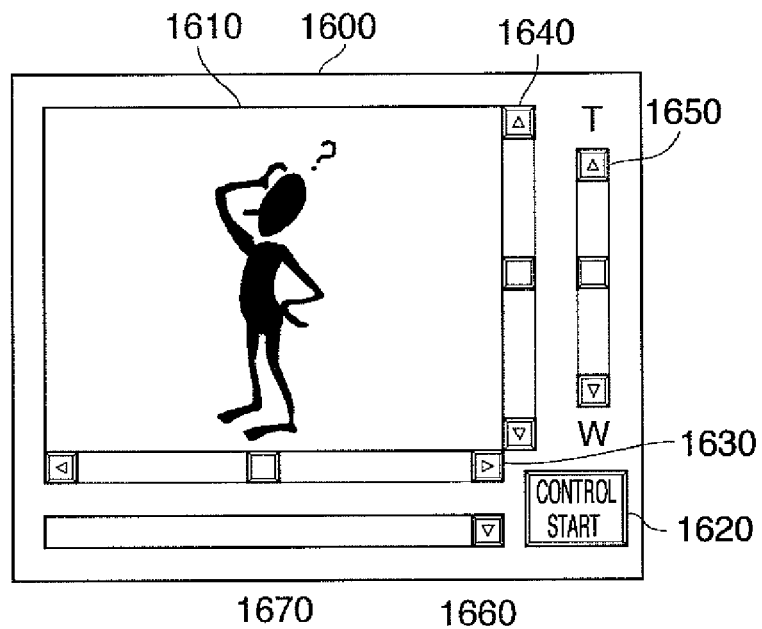
FIGS. 16A and 16B are views illustrating, by way of example, GUI screens displayed by an image output section and a cut-out area output section appearing in FIG. 10 (first example).
Figure 16B:
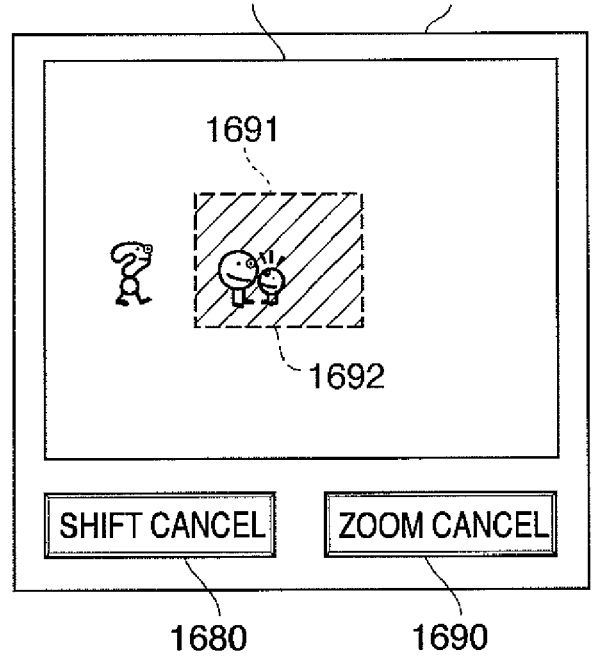

FIGS. 16A and 16B show an example of a GUI displayed in the state shown in FIG. 14. The GUI is comprised of a main window 1600 for displaying an output image output by the image output section 1003 and enabling operation using slide bars, and a sub window 1660 for displaying first and second cut-out areas with respect to a whole image. The GUI is configured to enable the user to perform input operations by clicking and dragging with a mouse.

The main window 1600 includes an output image display frame 1610, a control start button 1620 for switching between a control-enabled state and a control-disabled state, and a shift slide bar 1630 for shifting a second cut-out area laterally, and a shift slide bar 1640 for shifting the second cut-out area vertically. Further, the main window 1600 includes a zoom slide bar 1650 for changing the size of the second cut-out area.

The sub window 1660 includes a whole image display frame 1670, and a shift cancel button 1680 for canceling a shift of the second cut-out area to be executed by additional camera control. Further, the sub window 1660 includes a zoom cancel button 1690 for canceling a change of the size of the second cut-out area executed by additional camera control.

A still image of a whole image picked up in advance is displayed in the whole image display frame 1670, and a frame 1691 representative of a first cut-out area and a frame 1692 representative of a second cut-out area are displayed thereon.

Figure 17A:
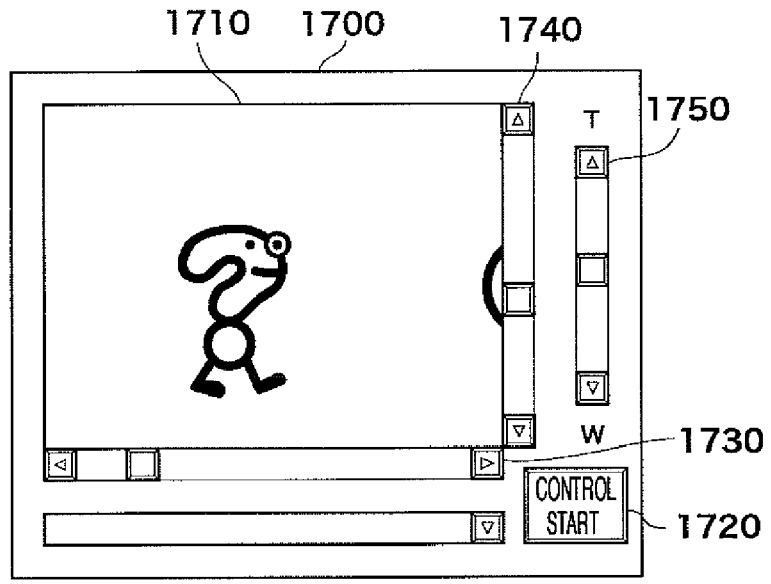
FIGS. 17A and 17B are views illustrating, by way of example, the GUI screens displayed by the image output section and the cut-out area output section (second example).
Figure 17B:
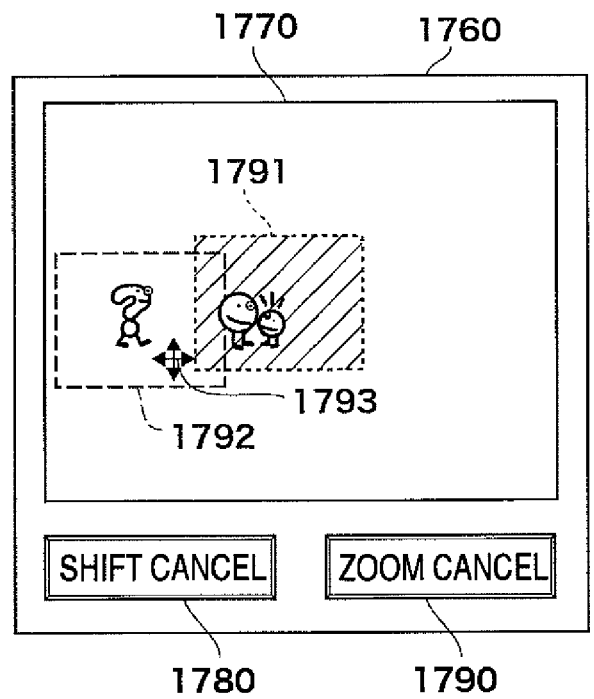

In this state, the user clicks the control start button 1620 to thereby obtain the control rights. This enables the user to change the shift and size change of the frame 1692 representative of the second cut-out area. When the user moves a mouse cursor into the frame 1692 at this time, as shown in FIG. 17B, a cross cursor 1793 is displayed, whereby shift of the frame by dragging the same is enabled. Further, when the cross cursor 1793 is moved onto a side of the frame 1692, size change of the frame by dragging is enabled.

When frame shift and size change are executed, determination conditions for determining the second cut-out area are generated by the camera control-requesting section 1006. When the shift cancel button 1780 (1680) is clicked after execution of the frame shift, an additional camera control cancellation request is generated for canceling the shift of the second cut-out area. Then, the frame representative of the second cut-out area shifts such that the center of a frame 1791 representative of the first cut-out area and that of a frame 1792 representative of the second cut-out area are aligned with each other.

When the zoom cancel button 1790 (1690) is clicked, an additional camera control cancellation request is generated for canceling the size change of the second cut-out area. Then, the size of the frame representative of the second cut-out area changes such that the size of the frame 1791 representative of the first cut-out area and that of the frame 1792 representative of the second cut-out area becomes equal to each other.

It should be noted that in the first embodiment, a first image size is defined as the image size of a partial image in a picked-up image obtained when control is performed according to the third camera control parameters, the partial image corresponding to a shooting range defined when control is performed according to the first camera control parameters. Further, a second image size is defined as the minimum image size of a tracking target that can be detected by the tracking method-calculating section 104. In this case, the conditional expressions used by the camera control method-calculating section 110 include conditional expressions for preventing the first image size from becoming smaller than the second image size.

Further, in the first embodiment, the conditional expressions used by the camera control method-calculating section 110 are included in part of software implementing the camera control method-calculating section 110.

Alternatively, the conditional expressions used by the camera control method-calculating section 110 are included in a part of a circuit implementing the camera control method-calculating section 110.

Each of the camera control request input section 105 in the first embodiment and the camera control-requesting section 1006 in the second embodiment includes a graphic user interface for accepting user input concerning the camera control method. Further, the graphic user interface includes a graphic user interface component via which the second camera control parameter in the first embodiment is input. Alternatively, the graphic user interface includes a graphic user interface component via which information on association between the first and second camera control parameters in the first embodiment is input.

It is to be understood that the object of the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-RON, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Applications No. 2006-153667, filed Jun. 1, 2006 and No. 2007-051259, filed Mar. 1, 2007 which are hereby incorporated by reference herein in its entirety.

What is claimed is:

1. A camera apparatus comprising:
   an image pickup section configured to obtain a video image;
   a tracking section configured to track a target in the video image by analyzing the video image, when the target moves in the video image;
   a receiving section configured to receive a camera control request;
   a cut-out area-determining section configured to determine a first cut-out area corresponding to the target and a second cut-out area corresponding to the camera control request, to move the first cut-out area according to movement of the target in the video image, and to move the second cut-out area from a position determined based on the camera control request to keep a relative positional relationship between the first and second cut-out areas so that a distance between the first and second cutout areas after the target tracked by the tracking section moves is maintained the same as before the target moves in the video image; and
   an image cutting section configured to cut out a first partial image of the first cut-out area and a second partial image of the second cut-out area, respectively, from the video image, and to output the first and second partial images.

2. The camera apparatus according to claim 1, further comprising a cut-out area output section configured to output to a display device a graphic user interface for displaying a relative position or size of each of the first cut-out area and the second cut-out area with respect to the video image.

3. The camera apparatus according to claim 1, wherein the size of the second cut-out area changes according to change in the size of the first cut-out area generated according to the movement of the target.

4. The camera apparatus according to claim 1, wherein the second cut-out area is moved with the movement of the first cut-out area to keep a horizontal distance between the first and second cut-out areas and a vertical distance between the first and second cut-out areas the same as before the target moves.

5. A method of controlling a camera apparatus having an image pickup section, an image receiving section, and a controller, the method comprising:
   an image obtaining step of obtaining a video image via the image pickup section;
   a tracking step of tracking a target in the video image by analyzing the video image with the controller, when the target moves in the video image;
   a receiving step of receiving a camera control request via the receiving section;
   a cut-out area-determining step of determining a first cut-out area corresponding to the target and a second cut-out area corresponding to the camera control request with the controller, moving the first cut-out area according to movement of the target in the video image, and moving the second cut-out area from a position determined based on the camera control request to keep a relative positional relationship between the first and second cut-out areas so that a distance between the first and second cutout areas after the target tracked by the tracking step moves is maintained the same as before the target moves in the video image; and
   an image cutting step of cutting out a first partial image of the first cut-out area and a second partial image of the second cut-out area, respectively, from the video image, and outputting the first and second partial images with the controller.

6. The method according to claim 5, further comprising a cut-out area output step of outputting to a display device a graphic user interface for displaying a relative position or size of each of the first cut-out area and the second cut-out area with respect to the video image.

7. The method according to claim 5, wherein the size of the second cut-out area changes according to a change in the size of the first cut-out area generated according to the movement of the target.

8. The method according to claim 5, wherein the second cut-out area is moved with the movement of the first cut-out area to keep a horizontal distance between the first and second cut-out areas and a vertical distance between the first and second cut-out areas the same as before the target moves.

9. A non-transitory computer-readable storage medium storing a computer program executable by a camera apparatus having an image pickup section, an image receiving section, and a controller, for controlling tracking of a target in a video image captured by the image pickup section, the computer program comprising:
   an image obtaining code configured to obtain a video image from the image pickup section;
   a tracking code configured to track the target in the video image by analyzing the video image, when the target moves in the video image;
   a receiving code configured to receive a camera control request via the receiving section;
   a cut-out area-determining code configured to determine a first cut-out area corresponding to the target and a second cut-out area corresponding to the camera control request, to move the first cut-out area according to movement of the target in the video image, and to move the second cut-out area from a position determined based on the camera control request to keep a relative positional relationship between the first and second cut-out areas so that a distance between the first and second cutout areas after the target tracked by the tracking code moves is maintained the same as before the target moves in the video image; and
   an image cutting code configured to cut out a first partial image of the first cut-out area and a second partial image of the second cut-out area, respectively, from the video image, and to output the first and second partial images.

10. The non-transitory computer-readable storage medium according to claim 9, further comprising a cut-out area output code configured to output to a display device a graphic user interface for displaying a relative position or size of each of the first cut-out area and the second cut-out area with respect to the video image.

11. The non-transitory computer-readable storage medium according to claim 9, wherein the size of the second cut-out area changes according to a change in the size of the first cut-out area generated according to the movement of the target.

12. The non-transitory computer-readable storage medium according to claim 9, wherein the second cut-out area is moved with the movement of the first cut-out area to keep a horizontal distance between the first and second cut-out areas and a vertical distance between the first and second cut-out areas the same as before the target moves.

* * * * *